Figure 1:
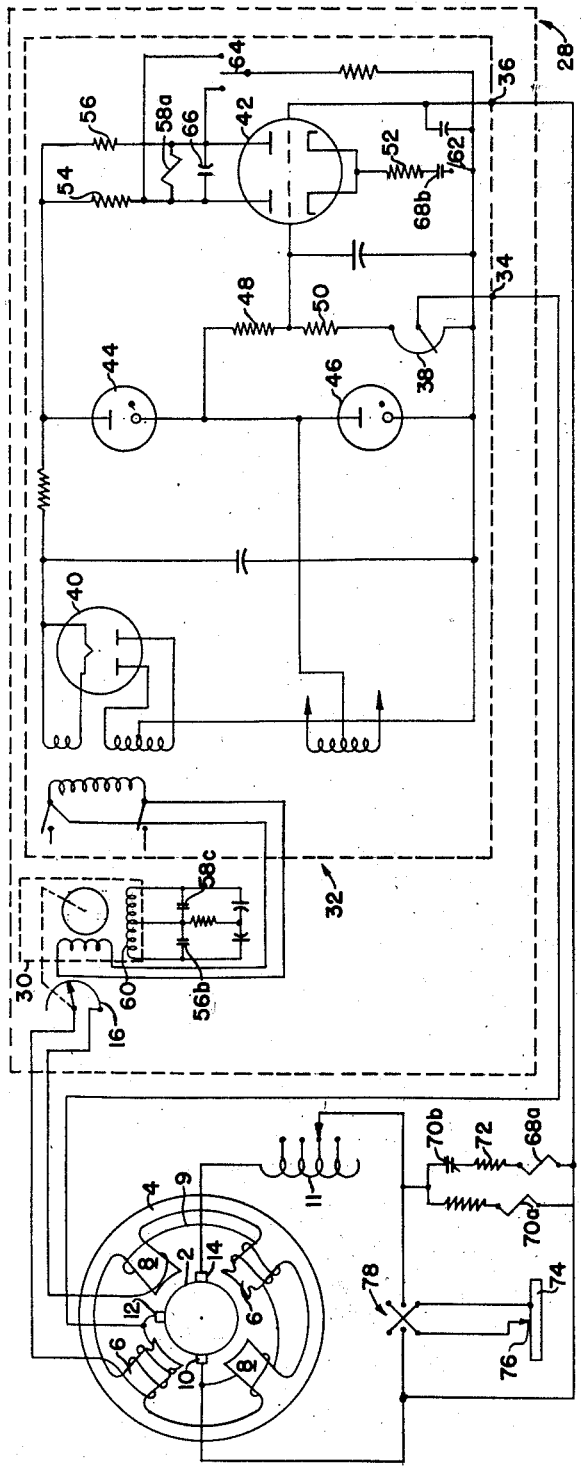

Jan. 7, 1958     W. J. GREENE ET AL     2,819,443

DIRECT CURRENT ARC WELDING GENERATOR

Filed Dec. 16, 1953

INVENTORS
WILLIAM J. GREENE
RICHARD B. STEELE
BY
ATTORNEYS

United States Patent Office 2,819,443
Patented Jan. 7, 1958

2,819,443

DIRECT CURRENT ARC WELDING GENERATOR

William J. Greene, Scotch Plains, and Richard B. Steele, New Providence, N. J., assignors to Air Reduction Company, Incorporated, New York, N. Y., a corporation of New York Application December 16, 1953, Serial No. 398,545

7 Claims. (Cl. 322—53)

This invention relates to direct current electric arc welding machines and more particularly to stablization of the volt-ampere curves of direct current arc welding generators of the type which employ three brushes and a field circuit including two or more sets of mechanical poles, one of which is operated at all times under conditions of saturation and the other of which is operated unsaturated. In certain machines of this type a shunt field winding connected in series on both the saturated and unsaturated poles is energized by the voltage developed across the saturated poles, collected between one load brush and the third brush.

Welding generators of this type are well known and have, even in the absence of the differentially compounded series windings usually available on their unsaturated poles, a falling volt-ampere characteristic of the kind which is desired in direct current arc welding. While armature reaction is unable to increase significantly (so far as the load circuit is concerned) the voltage developed across the main (saturated) poles, it does reduce that developed across the cross (unsaturated) poles and can be readily made to reverse the net flux flowing through them. The result is that the voltage between the load brushes spanning both sets of poles decreases rapidly with increasing load current, a tolerable value of load current reducing the output voltage to zero.

Welding generators of this kind however suffer from change in their output volt-ampere curves due to change in resistance of their shunt field windings with temperature and to change in commutation with heating and with the condtion of the commutator surface. Thus as a machine of this type heats up from a cold start the resistance of the field windings increases with temperature. This reduces the current in the field windings, substantially reducing the flux in the cross poles and shifting the entire volt-ampere curve in the direction of lowered currents and voltages. In addition, deviations from linear commutation may aid or oppose the total field and thus tend to raise or to lower the volt-ampere curve. These changes in output characteristics are troublesome to the operator and may require resetting of the generator several times during the course of a warmup period.

The present invention provides means whereby generators of this kind are automatically stabilized to work on a single volt-ampere characteristic curve regardless, within limits, of the temperature of their windings and of their state of commutation. According to the invention means are provided whereby the voltage is maintained constant between the two brushes to which the shunt field winding is connected. For reasons hereinafter explained constancy of this voltage results in an unchanging volt-ampere characteristic for the generator.

Figure 2:
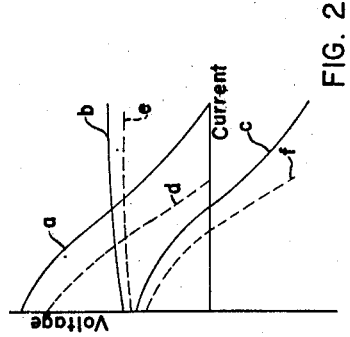

The invention will now be described in further detail in terms of an exemplary embodiment with respect to the accompanying drawings in which:

Fig. 1 is a schematic diagram of a welding generator according to the invention; and Fig. 2 is a diagram useful in explaining the operation of the system of Fig. 1.

In Fig. 1 the welding generator includes an armature indicated at 2 and a field yoke 4 supporting a par of main poles 6 and a pair of cross poles 8. The armature is coupled to a suitable constant speed driving mechanism, not shown. Shunt field windings 9 on the main and cross poles are connected in series together between two brushes 10 and 12 disposed on the commutator in position to gather a voltage dependent on the flux in the main poles 6 only. Load brushes 10 and 14 are disposed 180 electrical degrees apart and are so positiond that the voltage between them depends upon the sum of the fluxes in both pairs of pole pieces. The field windings are so oriented that the adjacent pole pieces of the two sets on one side of the pair of brushes 10 and 14 are of like polarity, and the effect of armature reaction is to aid the flux in the main poles while opposing that in the cross poles.

The main poles 6 are arranged to operate at all times under conditions of substantial saturation. This may be achieved by notching the pole pieces as shown or by providing a large number of turns on their field windings or by both methods. On the other hand the cross poles 8 operate below the region of saturation, i. e. they reach saturation, if at all, only when the armature is short-circuited. They are accordingly shown with a large cross section and with a small number of turns in their field windings. The generator may be provided with differentially compounded series turns on the cross poles, particularly for insertion by means of a tap switch when the generator is to be operated at light load. These are schematically shown at 11. No commutation poles are shown in the figure since these are conventional elements not essential to illustration of the invention, although they will usually be employed.

By virtue of the saturated condition of the main poles 6, the voltage developed in the armature across brushes 10 and 12 which span the main poles only is to a first approximation independent of load current—assuming of course a constant speed. Since the windings 9 are connected to brushes 10 and 12, the exciting current is to substantially the same approximation constant also, assuming a given temperature for the windings.

Further in view of the saturated condition of the main poles and unsaturated condition of the cross poles, the effect of armature reaction is to decrease the total flux provided by the two sets of poles together so that the machine has a falling volt-ampere curve as illustrated by curve $a$ in Fig. 2. Curve $a$ is the sum of $b$ and $c$, representing respectively the voltage induced in the armature by the main and cross poles, i. e. the algebraic sum of the voltages between brushes 10 and 12 and between brushes 12 and 14. The voltage due to the main poles is seen to be substantially constant, i. e. to increase very slowly with current. The voltage due to the cross poles falls rapidly with increasing load current due to armature reaction, and goes through zero to negative values when the flux in the cross poles due to armature reaction balances that due to the windings 9 thereon. The limiting current for the armature when short-circuited is reached when the voltage induced by the field of the main poles is balanced by an equal and opposite voltage due to the resultant reversed field in the cross poles.

In the machines of this type of the prior art, as the shunt field windings increased in temperature from a cold start their resistance increased so that the ampere turns effective in the creation of the main and cross fields declined. The volt-ampere characteristic of the machine was then reduced to a value such as that indicated by the curve $d$. The short circuit value of current was very considerably reduced. While the contribution to armature voltage due to the main pole field illustrated at curve $e$ declined only to a small extent, the voltage (curve $f$) due to the cross field fell much more rapidly to zero and to negative values wtih the growth in armature reaction, in view of the unsaturated condition of the cross poles. The resulting volt-ampere curve illustrated at $d$ is seen to be very significantly different from that of curve $a$. Accordingly variation in shunt field resistance required substantial readjustment in the operating conditions of the generator, for example by variation of the external resistance inserted into the shunt field circuit by means of a field reheostat or by change in the number of differentially compounded series turns effectively in the circuit.

The deviation from linear commutation which can arise upon change in brush pressure or the condition of the commutator surface can also shift the voltage-ampere characteristic although the changes here can either raise or lower the curve since the deviation may be such as either aids or opposes the field of the main and cross poles effective in developing voltage in the armature.

The invention provides means whereby variations in the volt-ampere curve of the generator due either to change in shunt field winding resistance with temperature or to changes in linearity of commutation are compensated for. A control unit generally indicated at 28 includes a rheostat 16 connected in series with the shunt field windings 9, a motor 30 coupled to the slider of rheostat 16 and a voltage comparison circuit generally indicated at 32 which governs a directionally sensitive relay for control of the motor 30. The control unit receives shunt field winding voltage between brushes 10 and 12 for application to the voltage comparison circuit at terminals 34 and 36.

In the voltage comparison circuit 32 a rectifier 40 develops a D. C. voltage for comparison with the shunt field winding voltage and for operation of a relay control tube 42.

Voltage regulator tubes 44 and 46 are connected across the output of the rectifier, and a potentiometer network comprising fixed resistors 48, 50 and potentiometer 38 are connected between the junction of the two regulator tubes and the negative side of the power supply. The junction of resistors 48 and 50 is connected to one grid of the control tube 42 which is shown in the form of a double triode the two halves of which are cathode coupled by means of a resistor 52.

The voltage to be maintained between the shunt field winding brushes 10 and 12 of the generator is set by adjustment of the potentiometer 38 and is equal to the drop between the junction of resistors 48 and 50 and the tap on potentiometer 38, which is conected directly to brush 12. In order to effect such control brush 10 is connected to the other grid of tube 42 at the amplifier input terminal 36.

Resistors 54 and 56 are connected in series with the two plates of tube 42 so as to develop a voltage differential between those plates when the two halves conduct unequally, as they will do whenever the voltage at brush 10 differs from the voltage at brush 12 by an amount other than that between the junction of resistors 48 and 50 and the tap on potentiometer 38.

There is connected between the plates of tube 42 the coil 58a of a polarized relay having two normally open contacts 58b and 58c connected across the two shading coils 60 of the reversible motor 30. If the voltage between the brushes 10 and 12 of the generator falls, due to increase in shunt field winding resistance for example, conduction in the right half of tube 42 will decline whereas conduction in the left half will increase. The sign of the resulting potential difference between the plates of tube 42 energizes the relay 58 to close that one of its contacts 58b and 58c which results in rotation of the motor 30 in the sense required to reduce the effective value of the shunt field rheostat 16.

A manually operated switch 62 is connected in the cathode circuit of the control tube in order to permit selection between automatic and manual control of the field rheostat. When switch 62 is opened, the control tube is disabled, but the effective resistance of the shunt field rheostat may be increased or decreased by manually shifting a switch 64 from its spring loaded open position to contact with one or the other of the plates of tube 42. Upon the making of such contact a potential drop is created across one or the other of the plate load resistors 54 and 56 to send current through the relay coil in one or the other of two senses appropriate to increase or decrease of the shunt field rheostat value. A capacitor 66 in parallel with relay coil 58a prevents chattering of its contacts.

Additional relays 68 and 70 are provided in order to limit operation of the control system including tube 42 to periods when the generator is under load, even when the automatic-manual switch 62 is in automatic position. The coil 68a of relay 68 is connected in series with a current limiting resistor 72 and a pair of normally closed contacts 70b of relay 70 between the load brushes 10 and 14 of the generator. Relay 68 includes a pair of normally open contacts 68b connected in series with the common cathode circuit of the control tube 42. It prevents control when the generator load terminals are short-circuited at the start of the weld. Relay 70, whose coil 70a is connected in series with a limiting resistor across the welding terminals, is adjusted to open the contacts 70b when the generator is operating at speed but is open circuited, i. e. operating without load.

The load brushes 10 and 14 are shown in Fig. 1 connected to a workpiece 74 and a welding electrode 76 through a polarity reversing switch 78.

When the machine is operating at speed and under load, with switch 62 closed, the control unit 28 will adjust the value of the resistance in the shunt field circuit of windings 9 as required to maintain the voltage between brushes 10 and 12 at the value set at potentiometer 38. With the voltage between brushes 10 and 12 so maintained, the machine will be held to a single volt-ampere curve. This is true because, apart from a small effect of hysteresis in the magnetic field circuit, both main and cross poles are characterized by single magnetization curves and because not even the main poles are ever thoroughly saturated. A reduction in the resistance of the shunt field circuit effected by the control unit 28 at rheostat 16 in response, for example, to an increase with temperature in the resistance of the windings 9 themselves, will restore the exciting current to its former value, at which the main pole flux produced by the windings 9 on the main poles in restored to its former value. Since the same current flows through the windings 9 on both main and cross poles, the flux developed in the cross poles by the windings thereon is also restored to its former value.

The operation of the invention may be stated in another way. Constancy of the voltage between brushes 10 and 12 is the result of constant flux in the main field poles. Such constancy of flux will be achieved by keeping constant the current in the windings 9 except as modifications of that constant current are required to compensate for effects in the main poles of deviation from linear commutation and of armature reaction, which in the main poles is minor and which depends upon instantaneous load current.

The effect of changes in resistance of the shunt field windings on the main and cross pole fluxes and the operation of the control unit to compensate therefor by holding the shunt field current constant have already been described. The effect of armature reaction in modifying the constant shunt field winding current criterion is simply to modify the single characteristic curve to which the generator is held by the control unit, causing the curve to drop slightly faster with increasing load current than, in the absence of voltage regulation, it would do for any given temperature of the shunt field windings and for any given degree of linearity of commutation. Changes in linearity of commutation are comparable to changes in demagnetizing armature turns which occur with shift of the load brush axis. They are therefore similar to cumlatively or differentially compounded series turns wound on the main and cross poles together. Changes in linearity of commutation are therefore also compensated for by the control unit. A change in linearity of commutation imposes different changes on the main pole and cross pole fluxes in view of their different states of saturation. Conversely however in view of the series connection of the windings 9 on the main and cross poles, the change in current flowing through these windings effected by the control unit via its response to voltage at the brushes 10 and 12 to compensate for the change in main pole flux due to change in linearity of commutation likewise operates on the unsaturated cross poles with the greater effect required to compensate for the greater change in cross pole flux due to such change in linearity of commutation.

While the invention has been described with reference to a particular voltage-responsive circuit for change of shunt field winding resistance to maintain constant the voltage generated in the armature across the main poles, other circuits falling within the scope of the appended claims may be employed for this purpose. The invention may also find embodiment in machines employing more than one set of main and one set of cross poles.

We claim:

1. A direct current welding generator comprising a field circuit including a pair of main poles adapted to operate under conditions of substantial saturation and a pair of cross poles adapted to operate non-saturated, an armature, a commutator on said armature, a pair of load brushes so positioned on the commutator that the voltage difference between said load brushes is dependent on the flux in both main and cross poles, an auxiliary brush so positioned on the commutator that the voltage difference between said auxiliary brush and one of said load brushes is dependent on the flux in said main poles, a winding on at least one pole of each pair, said windings being connected in series between said one load brush and said auxiliary brush, a variable resistance connected in series with said windings, and voltage-responsive means to adjust the value of said resistance to maintain constant the voltage between said one load brush and said auxiliary brush.

2. A direct current welding generator comprising a field circuit including a pair of main poles adapted to operate under conditions of susbtantial saturation, a pair of cross poles adapted to operate under conditions of non-saturation, an armature, a commutator on said armature, a pair of load brushes so positioned on said commutator that the voltage difference between said load brushes is dependent on the flux in both main and cross poles, an auxiliary brush displaced on said commutator from one of said load brushes in position to gather with said one load brush a voltage due to flux in said main poles only, a winding on at least one pole of each of said pairs, said windings being connected in series between said auxiliary brush and said one load brush, and automatic means to maintain constant the voltage between said one load brush and said auxiliary brush.

3. A direct current welding generator comprising an armature having a commutator, a pair of load brushes bearing on said commutator 180 electrical degrees apart, an auxiliary brush bearing on said comutator, a magnetic field circuit including a pair of saturated and a pair of unsaturated poles and field windings arranged on at least one pole of each of said pairs, said windings being connected in series between one of said load brushes and said auxiliary brush, said auxiliary brush and said one load brush being so disposed that the voltage therebetween is due to flux in said saturated poles, a variable resistance connected in series with said windings, and motor means responsive to changes in said voltage coupled to said variable resistance to maintain said voltage constant.

4. A direct current welding generator comprising a field circuit including a pair of main poles adapted to operate under conditions of substantial saturation, a pair of cross poles adapted to operate under conditions of nonsaturation, and armature, a commutator on said armature, a pair of load brushes bearing on said commutator in such position that the voltage difference between said brushes is dependent on the flux in both main and cross poles, an auxiliary brush displaced from one of said load brushes in position to gather with said one load brush a voltage due to flux in said saturated poles only, a winding on at least one pole of each of said pairs, said windings being connected in seires between said auxiliary brush and said one load brush, and means to maintain constant the voltage between said one load brush and said auxiliary brush, said means including a first variable resistance connected in series with said windings, a direct current voltage source, a second resistance connected across said source, a polarized relay connected effectively in series with said auxiliary brush and said one load brush across a portion of said second resistance, and motor means responsive to actuation of said relay to adjust the value of said first variable resistance until the voltage between said auxiliary brush and said one load brush is equal to the voltage from said source developed across said portion of said second resistance.

5. A direct current welding generator comprising a field circuit including a pair of main poles adapted to operate under conditions of substantial saturation, a pair of cross poles adapted to operate under conditions of non-saturation, an armature, a commutator on said armature, a pair of load brushes bearing on said commutator in such position that the voltage difference between said load brushes is dependent on the flux in both main and cross poles, an auxiliary brush displaced on said commutator from one of said load brushes in position to gather with said one load brush a voltage due to flux in said saturated poles only, a winding on at least one pole of each of said pairs, said windings being connected in series between said auxiliary brush and said one load brush, and means to maintain constant the voltage between said one load brush and said auxiliary brush, said means including a first variable resistance connected in series with said windings, a direct current voltage source, a second resistance connected across said source, a relay, means effectively connecting said relay in series with said auxiliary brush and said one load brush across a selected portion of said second resistance, and means responsive to the actuation of said relay to adjust the value of said first variable resistance.

6. A direct current welding generator comprising a field circuit including a pair of main poles adapted to operate under conditions of substantial saturation, a pair of cross poles adapted to operate under conditions of nonsaturation, an armature, a commutator on said armature, a pair of load brushes bearing on said commutator in such position that the voltage difference between said load brushes is dependent on the flux in both main and cross poles, an auxiliary brush displaced on said commutator from one of said load brushes in position to gather with said one load brush a voltage due to flux in said saturated poles only, a winding on at least one pole of each of said pairs, said windings being connected in series between said auxiliary brush and said one load brush, and means to maintain constant the voltage between said one load brush and said auxiliary brush, said means including a first variable resistance connected in series with said windings, a stabilized direct current voltage source, a second resistance connected across said voltage source, two triode vacuum tube electron discharge devices cathode coupled together, a plate load resistor in series with the plate of each of said devices, a polarized relay having its coil connected between said plates, a connection between the control grid of one of said devices and a first point on said second resistance, means to apply the voltage between said auxiliary brush and said one load brush between another point on said second resistance and the control grid of said other device, and a reversible motor arranged for rotation in opposite directions upon actuation of said relay in opposite polarities respectively, said motor being coupled to said first variable resistance.

7. A direct current welding generator comprising a field circuit including a pair of main poles adapted to operate under conditions of substantial saturation, a pair of cross poles adapted to operate under conditions of nonsaturation, an armature, a commutator on said armature, a pair of load brushes bearing on said commutator in such position that the voltage difference between said load brushes is dependent on the flux in both main and cross poles, an auxiliary brush displaced on said commutator from one of said load brushes in position to gather with said one load brush a voltage due to flux in said saturated poles only, a winding on at least one pole of each of said pairs, said windings being connected in series between said auxiliary brush and said one load brush, and means to maintain constant the voltage between said one load brush and said auxiliary brush, said means including a rheostat connected in series with said windings, a direct current voltage source, a resistance connected across said voltage source, two vacuum tube electron discharge devices each including a cathode, an anode and at least one control electrode, a load resistor in series with the anode of each of said devices, a polarized relay having its coil connected between said anodes, a connection between the control electrode of one of said devices and a first point on said resistance, means to apply the voltage between said auxiliary brush and said one load brush between another point on said resistance and the control electrode of said other device, and a reversible motor arranged for rotation in opposite directions upon actuation of said relay in opposite polarities respectively, said motor being coupled to said rheostat.

References Cited in the file of this patent
UNITED STATES PATENTS

| | | |
|---|---|---|
| 1,842,781 | Halsey | Jan. 26, 1932 |
| 2,030,678 | Bergman | Feb. 11, 1936 |